(12) United States Patent
Sinico et al.

(10) Patent No.: US 10,559,999 B2
(45) Date of Patent: Feb. 11, 2020

(54) SUBMERSED ELECTRIC MOTOR

(71) Applicant: DAB PUMPS S.P.A., Mestrino (IT)

(72) Inventors: Francesco Sinico, Montecchio Maggiore (IT); Giuliano Moretto, San Dona' di Piave (IT)

(73) Assignee: DAB PUMPS S.P.A., Mestrino (IT)

( * ) Notice: Subject to any disclaimer, the term of this patent is extended or adjusted under 35 U.S.C. 154(b) by 379 days.

(21) Appl. No.: 15/587,193

(22) Filed: May 4, 2017

(65) Prior Publication Data
US 2017/0324299 A1   Nov. 9, 2017

(30) Foreign Application Priority Data

May 4, 2016   (IT) .......... 102016000045598

(51) Int. Cl.
| | |
|---|---|
| *H02K 5/22* | (2006.01) |
| *H02K 5/132* | (2006.01) |
| *H02K 5/08* | (2006.01) |
| *H02K 11/00* | (2016.01) |
| *H02K 17/08* | (2006.01) |
| *H02K 17/30* | (2006.01) |

(52) U.S. Cl.
CPC ............ *H02K 5/225* (2013.01); *H02K 5/08* (2013.01); *H02K 5/132* (2013.01); *H02K 11/0094* (2013.01); *H02K 17/08* (2013.01); *H02K 17/30* (2013.01)

(58) Field of Classification Search
CPC .......... H02K 5/225; H02K 5/08; H02K 5/132; H02K 11/0094

USPC ........................................ 310/87, 68 R, 67 R
See application file for complete search history.

(56) References Cited

U.S. PATENT DOCUMENTS

| | | | |
|---|---|---|---|
| 4,808,868 A | * | 2/1989 | Roberts ................... H02K 3/16 310/184 |
| 6,359,353 B1 | | 3/2002 | Bevington |
| 2002/0171301 A1 | * | 11/2002 | Neri ........................ H02K 5/132 310/68 R |
| 2006/0082230 A1 | * | 4/2006 | Bevington ............. H02K 5/132 310/72 |

FOREIGN PATENT DOCUMENTS

DE   4203482 A1   8/1993

* cited by examiner

*Primary Examiner* — Hanh N Nguyen
(74) *Attorney, Agent, or Firm* — Cantor Colburn LLP

(57) ABSTRACT

A submersed electric motor includes
 a stator assembly arranged within an annular insulation chamber, and a stator with stator windings and a capacitive electric starter which is connected electrically thereto.
The insulation chamber is formed between an outer tubular jacket, an inner tubular jacket, which is coaxial to the outer tubular jacket, with two annular end covers adapted to close the annular interspace between the outer jacket and the inner jacket.
The submersed electric motor further includes
 a rotor arranged inside the inner tubular jacket.
The capacitive electric starter includes at least two capacitors, which are mutually complementary, and have a transverse cross-section with an arc-like profile and are connected in parallel to each other.

10 Claims, 3 Drawing Sheets

SUBMERSED ELECTRIC MOTOR

CROSS-REFERENCE TO RELATED APPLICATIONS

This application is related to and claims the benefit of Italian Patent Application No. 102016000045598, filed on May 4, 2016, the contents of which are herein incorporated by reference in their entirety.

TECHNICAL FIELD

The present disclosure relates to a submersed electric motor.

BACKGROUND

Corresponding submersed electric motors are currently known and widely used for the actuation of submersed pumps.

One widespread type of submersed motor comprises:
- a stator assembly, arranged within an annular insulation chamber, comprising stator windings and an annular capacitor which is electrically connected to them,
- the insulation chamber is formed between an outer tubular jacket, an inner tubular jacket, which is coaxial to said outer tubular jacket, with two annular end covers adapted to close the annular interspace between said outer jacket and said inner jacket,
- a rotor, with a rotation shaft, arranged inside said inner tubular jacket.

Although these motors are widespread and appreciated, they have some improvable aspects linked to the presence of the annular capacitor.

In order to facilitate wiring with the stator windings on one side and the connection to a power supply line on the other side, the annular capacitor is in fact arranged in an axial direction between said stator windings and the annular cover from which the rotation shaft of the rotor protrudes.

In this position the annular capacitor obstructs the passage of the insulation resin that must fill the annular interspace and embed all the electrical elements contained therein.

A second limitation of known submersed motors with annular capacitor arises from the fact that the annular capacitor is arranged, in an axial direction, so as to rest on the windings, either directly or by interposition of an intermediate disk.

Since the resting surface formed by the windings is uneven, the capacitor may arrange itself imperfectly, axially offset with respect to the axis of symmetry of the motor, with consequent disadvantages both during the assembly of the motor and for the operations for resin casting the annular chamber.

SUMMARY

The aim of the present disclosure is to provide a submersed electric motor that is capable of obviating the cited limitations of the background art.

Within this aim, the disclosure provides a submersed electric motor that is easier to assemble and resin cast.

The present disclosure also provides a submersed electric motor the annular capacitor of which is arranged in a precise and stable manner.

The present disclosure further provides a submersed electric motor the compactness of which is equal to, if not better than, known submersed motors.

The present disclosure also provides a submersed electric motor the efficiency and performance of which are obviously not inferior to those of similar motors of the known type.

These advantages that will become better apparent hereinafter, are achieved by providing a submersed electric motor according to claim 1.

BRIEF DESCRIPTION OF THE DRAWINGS

Further characteristics and advantages of the disclosure will become better apparent from the description of a preferred but not exclusive embodiment of the submersed electric motor according to the disclosure, illustrated by way of non-limiting example in the accompanying drawings, wherein.

DETAILED DESCRIPTION OF THE DRAWINGS

Figure 1:
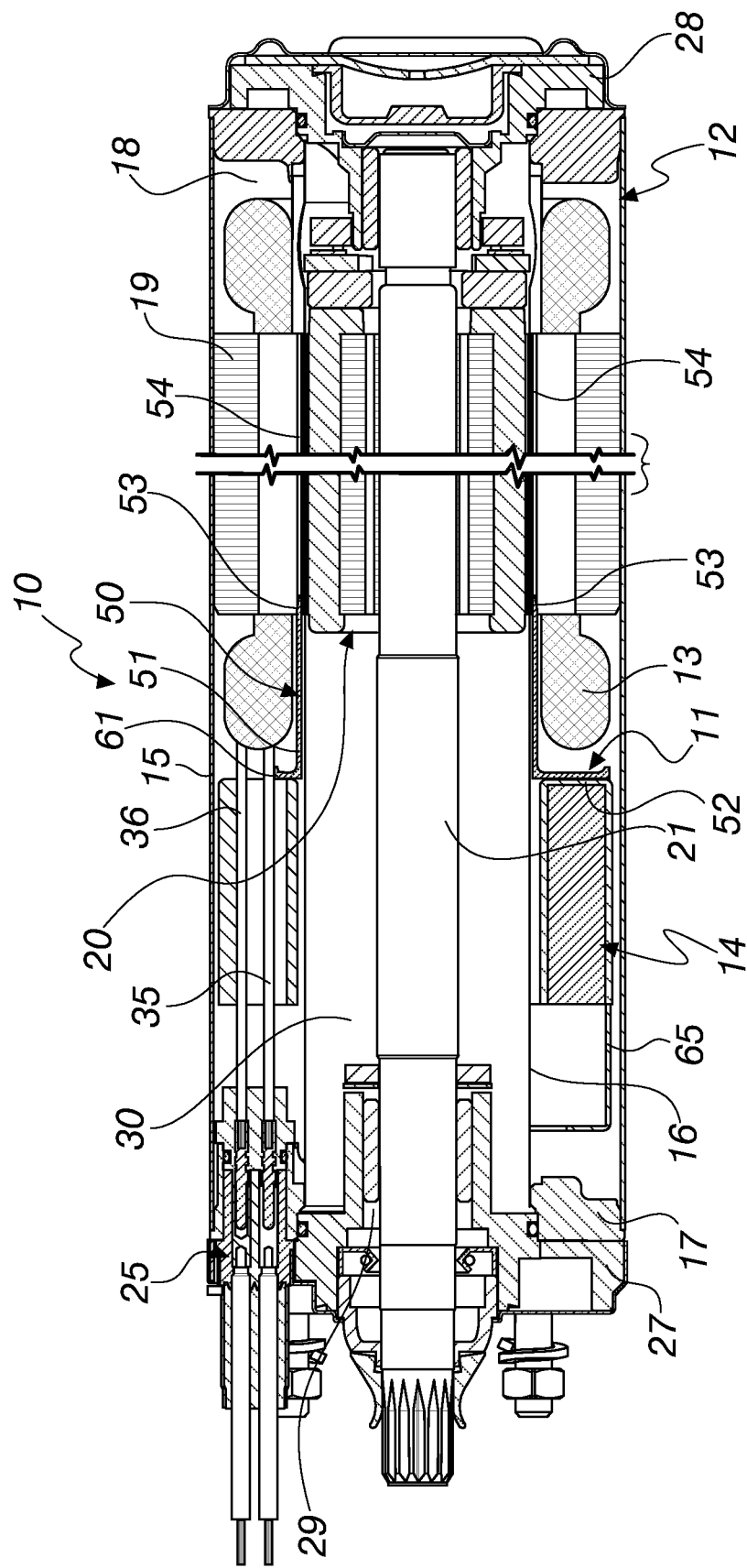
FIG. 1 is a longitudinal sectional side view of a submersed electric motor according to the disclosure.
Figure 2:
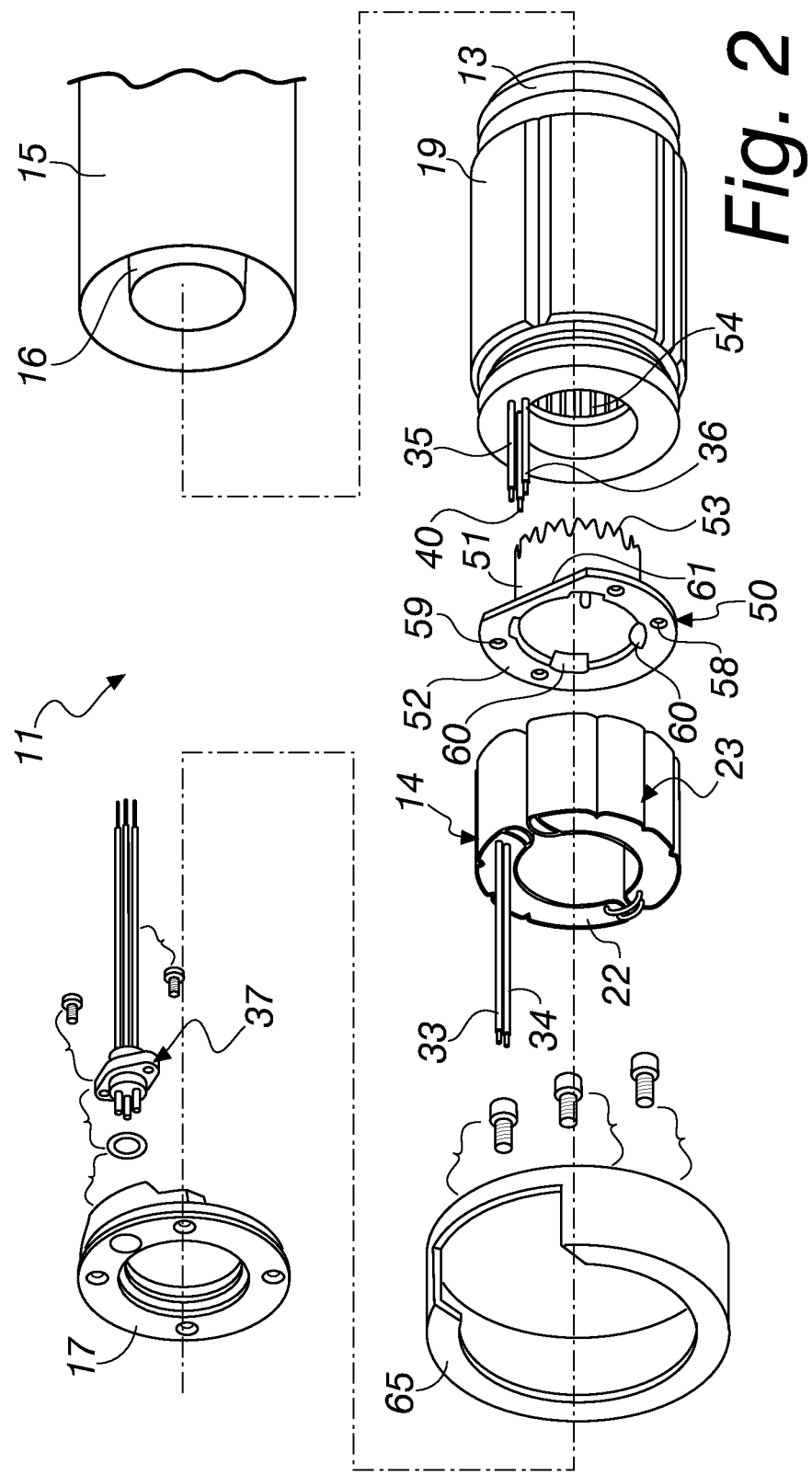
FIG. 2 is an exploded perspective view of part of a submersed electric motor according to the disclosure.
Figure 3:
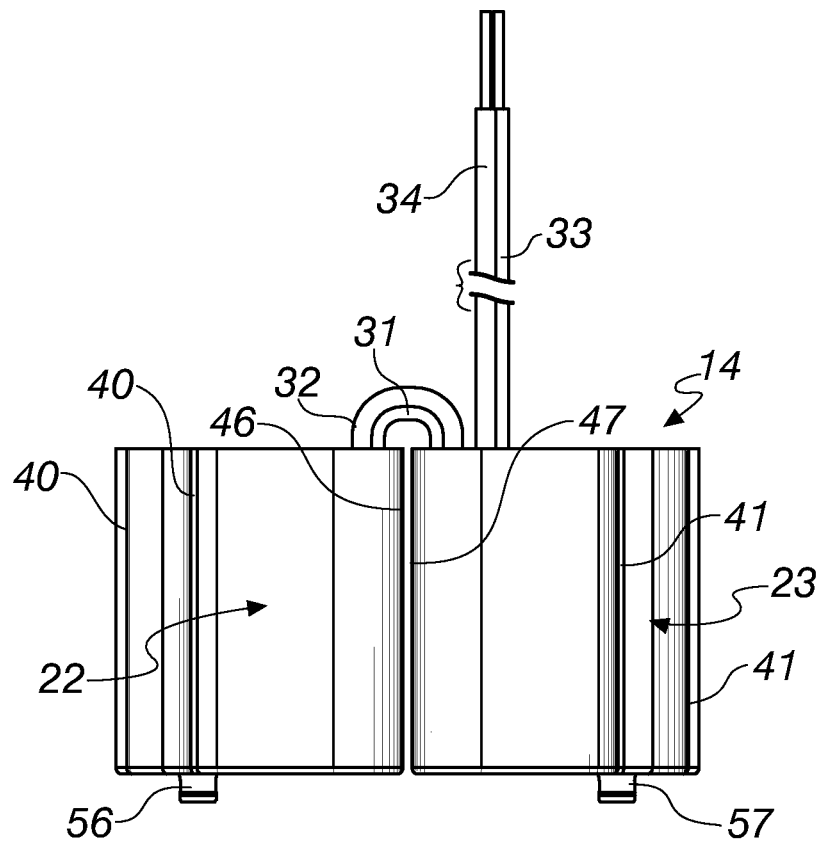
FIG. 3 is a side view of an annular capacitor of a motor according to the disclosure.
Figure 4:
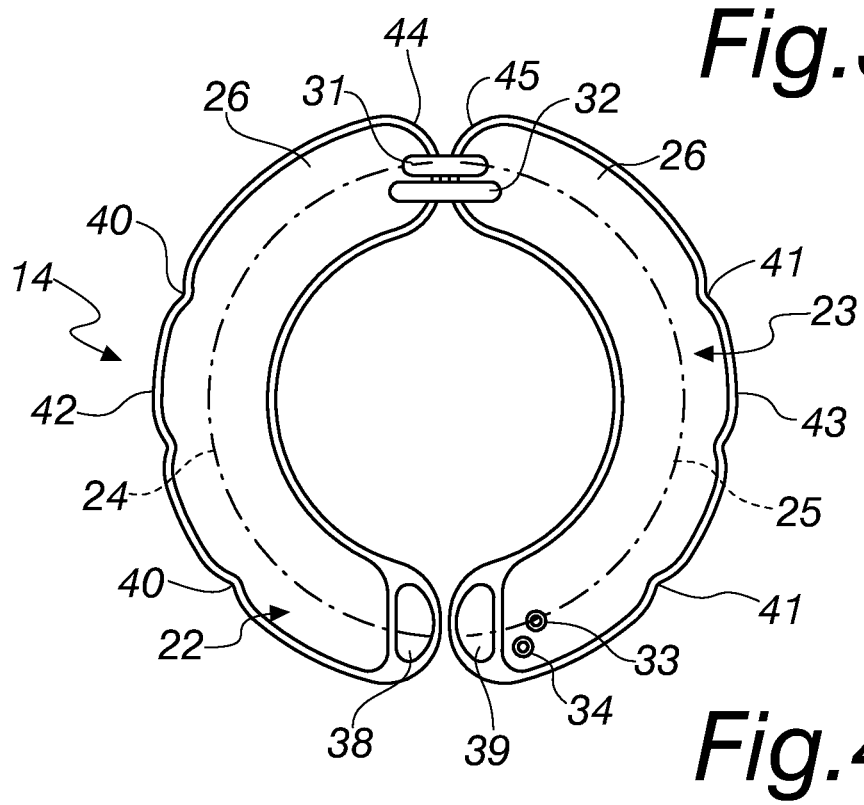
FIG. 4 is a top view of the annular capacitor of FIG. 3.

With reference to the figures, a submersed electric motor according to the disclosure is designated generally by the reference numeral 10.

The submersed motor 10 comprises:
- a stator assembly 11 arranged within an annular insulation chamber 12, comprising a stator 19 with stator windings 13 and a capacitive electric starter 14 which is connected electrically thereto,
- the annular insulation chamber 12 is formed between an outer tubular jacket 15, an inner tubular jacket 16, which is coaxial to the outer tubular jacket 15, with two annular end covers 17 and 18 adapted to close the annular interspace between the outer jacket 15 and the inner jacket 16,
- a rotor 20, with a rotation shaft 21, which is arranged inside the inner tubular jacket 16.

The motor is completed by two opposite caps 27 and 28, a first cap 27 with a contoured axial hole 29 for the passage and resting of the shaft 21 and a second cap 28 acting as a hermetic closure bottom for the cylindrical chamber 30 formed inside the inner chamber 16.

The particularity of the submersed motor 10 according to the disclosure resides in that the capacitive electric starter 14 comprises two mutually complementary capacitors 22 and 23, the transverse cross-section of which has an arc-like profile 24 and 25.

These two capacitors 22 and 23 are connected in parallel to each other.

Each one of the two capacitors 22 and 23 is constituted by a hollow body made of plastic material, which is open at one end for the insertion of the appropriately electrically connected capacitive units, and of the insulation resin 26.

The two capacitors 22 and 23 are therefore substantially each crescent-shaped.

The two capacitors 22 and 23 are connected in parallel by means of two cables 31 and 32, so as to provide the nominal value of the capacitive electric starter required by the specification; this structure of the capacitive electric starter 14 facilitates an easier arrangement of the capacitive units that are present inside the casings and reduces the required tolerance range of the capacitive value.

The capacitive electric starter 14 is provided with two output cables 33 and 34, which exit from a single side, so as to facilitate the connection to the cables 35 and 36 for connection to the windings 13 and to the male plug 37 for external power supply.

Each one of the two capacitors 22 and 23 of the capacitive electric starter 14 has a longitudinal channel 38 and 39 respectively, which is adapted to allow the passage of the connecting cables 35, 36 and 40 of the stator windings 13 and at the same time forms a passage for the insulation resin when it is poured into the annular chamber 12.

The longitudinal channels 38 and 39 are, for example, tubular.

The longitudinal channels 38 and 39 are formed at one end of the respective arc-like profile 24 or 25 of the two capacitors 22 and 23.

In particular, one of said longitudinal channels, for example the longitudinal channel 39 of the capacitor 23 from which the output cables 33 and 34 exit, is formed in such a position that the cables 35 and 36 for connection of the stator windings 13 arrange themselves proximate to the output cables 33 and 34, so as to facilitate their mutual connection.

Each one of the capacitors 22 and 23 of the capacitive electric starter 14 has a plurality of longitudinal cavities 40 and 41 respectively, for example on the outer surface 42 and 43, in order to facilitate the passage of the insulation resin, for example epoxy resin.

The facing end surfaces 44, 45, 46 and 47 of the two capacitors 22 and 23 are rounded, so as to provide additional longitudinal passage spaces for the insulation resin.

The submersed motor 10 according to the disclosure also comprises a capacitor supporting cap 50, which comprises a sleeve 51 that is contoured to enter the central compartment of the stator 19, an annular resting flap 52 for the capacitors 22 and 23 extending from the sleeve 51.

Centering and resting tabs 53 extend from the sleeve 52 in an axial direction and are adapted to enter the longitudinal slots 54 between the poles of the stator 19 on which the windings 13 are wound.

In this manner, the capacitor supporting cap 50 arranges itself precisely and stably with respect to the windings 13 and accordingly the capacitors 22 and 23 rested thereon are arranged precisely and stably.

In particular, there are means for the quick fixing of the capacitors 22 and 23 on the cap 50.

For example, said quick fixing means are constituted by elastic tabs for snap coupling 56 and 57, which are provided with extraction-preventing teeth and are adapted to enter by snap action corresponding holes 58 and 59 formed in the annular resting flap 52 of the cap 50.

By virtue of these quick fixing means, the operation for casting the insulation resin causes no displacement of the capacitors 22 and 23 of the capacitive electric starter 14, which remain in their ideal design position.

The cap 50 is also provided with openings 60 for the passage of the resin.

Furthermore, the annular flap 52 is provided with a portion 61 that has a reduced radial extension and is adapted to facilitate the passage of the cables 35, 36 and 40 of the windings 13.

Furthermore, the cap 50 allows to arrange no insulating material on the inside diameter of the nearby head of the windings 13.

The cap 50, with the capacitors 22 and 23, fixed to the stator 19, allows to have structural stability and facilitates the step of insertion of said assembly within the outer jacket 15.

A protective cap 65 is arranged between the capacitive electric starter 14 and the nearby annular cover 27 and is designed to avoid any electrical contacts between connecting cables and metallic parts.

In practice it has been found that the disclosure achieves the intended aim and objects.

In particular, the disclosure has provided a submersed electric motor that is easier to assemble and resin cast.

Furthermore, the disclosure provides a submersed electric motor the capacitive electric starter of which is arranged precisely and stably.

Moreover, the disclosure has perfected a submersed electric motor the compactness of which is equal to, if not better than, known submersed motors.

Furthermore, the disclosure provides a submersed electric motor the efficiency and performance of which obviously are not inferior to those of similar motors of the known type.

The disclosure thus conceived is susceptible of numerous modifications and variations; all the details may further be replaced with other technically equivalent elements.

In practice, the components and materials used, so long as they are compatible with the specific use, as well as the contingent shapes and dimensions, may be any according to the requirements and the state of the art.

What is claimed is:

1. A submersed electric motor, comprising:
   a stator assembly arranged within an insulation chamber, comprising a stator with stator windings and a capacitive electric starter which is connected electrically thereto,
   said annular insulation chamber being formed between an outer tubular jacket, an inner tubular jacket, which is coaxial to said outer tubular jacket, with two annular end covers adapted to close an annular interspace between said outer jacket and said inner jacket, and
   a rotor, with a rotation shaft, which is arranged inside said inner tubular jacket, wherein said capacitive electric starter comprises at least two capacitors, which are mutually complementary and have a transverse cross-section with an arc-like profile.

2. The submersed motor according to claim 1, wherein said at least two capacitors are connected in parallel to each other.

3. The submersed motor according to claim 1, further comprising two of said at least two capacitors which are mutually complementary, each one of the two capacitors being constituted by a hollow body made of plastic material, which is open on one side for the insertion of the capacitive units and of the insulation resin.

4. The submersed motor according to claim 1, wherein said capacitive electric starter has two output cables that exit from a single side, so as to facilitate the connection to the cables for connection to the windings and to a male plug for external power supply.

5. A submersed electric motor comprising:
   a stator assembly arranged within an insulation chamber, comprising a stator with stator windings and a capacitive electric starter which is connected electrically thereto,
   said annular insulation chamber being formed between an outer tubular jacket, an inner tubular jacket, which is coaxial to said outer tubular jacket, with two annular end covers adapted to close an annular interspace between said outer jacket and said inner jacket, and a rotor, with a rotation shaft, which is arranged inside said inner tubular jacket, wherein said capacitive electric starter comprises at least two capacitors, which are mutually complementary and have a transverse cross-section with an arc-like profile, wherein said capacitive electric starter has two output cables that exit from a single side, so as to facilitate the connection to the cables for connection to the windings and to a male plug for external power supply, wherein each one of the two capacitors of the capacitive electric starter has a longitudinal channel adapted to allow the passage of the connecting cables of the stator windings, and at the same time forms a passage for an insulation resin when it is poured into the annular chamber.

6. The submersed motor according to claim 5, wherein said longitudinal channels are formed at an end of the respective arc-like profile of the two capacitors.

7. A submersed motor comprising:
  a stator assembly arranged within an insulation chamber, comprising a stator with stator windings and a capacitive electric starter which is connected electrically thereto,
  said annular insulation chamber being formed between an outer tubular jacket, an inner tubular jacket, which is coaxial to said outer tubular jacket, with two annular end covers adapted to close an annular interspace between said outer jacket and said inner jacket, and
  a rotor, with a rotation shaft, which is arranged inside said inner tubular jacket,
wherein said capacitive electric starter comprises at least two capacitors, which are mutually complementary and have a transverse cross-section with an arc-like profile,
wherein each one of the capacitors of the capacitive electric starter has a plurality of longitudinal cavities to facilitate the passage of insulating resin.

8. A submersed motor comprising:
  a stator assembly arranged within an insulation chamber, comprising a stator with stator windings and a capacitive electric starter which is connected electrically thereto,
  said annular insulation chamber being formed between an outer tubular jacket, an inner tubular jacket, which is coaxial to said outer tubular jacket, with two annular end covers adapted to close an annular interspace between said outer jacket and said inner jacket, and
  a rotor, with a rotation shaft, which is arranged inside said inner tubular jacket,
wherein said capacitive electric starter comprises at least two capacitors, which are mutually complementary and have a transverse cross-section with an arc-like profile, further comprising a capacitor supporting cap, which comprises a sleeve that is contoured to enter a central compartment of the stator, an annular resting flap for the capacitors extending from said sleeve.

9. The submersed motor according to claim 8, wherein resting tabs extend in an axial direction from the sleeve and are adapted to enter the longitudinal slots between the poles of the stator on which the windings are wound.

10. The submersed motor according to claim 8, further including means for quick-fixing of the capacitors on the cap.

* * * * *